US008910534B2

(12) United States Patent
Huang et al.

(10) Patent No.: US 8,910,534 B2
(45) Date of Patent: Dec. 16, 2014

(54) ROTATION ADJUSTING MECHANISM AND ADJUSTING MACHINE USING THE SAME

(75) Inventors: Kai Huang, New Taipei (TW); Chi-Chao Luo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 253 days.

(21) Appl. No.: 13/455,333

(22) Filed: Apr. 25, 2012

(65) Prior Publication Data

US 2013/0145870 A1 Jun. 13, 2013

(30) Foreign Application Priority Data

Dec. 12, 2011 (CN) .......................... 2011 1 0411568

(51) Int. Cl.
*F16H 19/04* (2006.01)

(52) U.S. Cl.
USPC ................................................. 74/29; 33/655

(58) Field of Classification Search
CPC ....... B23Q 1/28; B23Q 1/623; B23Q 57/0498
USPC ................ 74/29; 269/71, 73, 309; 248/187.1; 33/655
See application file for complete search history.

(56) References Cited

U.S. PATENT DOCUMENTS 2,957,362 A * 10/1960 Kelm .............................. 74/405
3,638,933 A * 2/1972 Burnette et al. ................ 269/60
4,577,845 A 3/1986 Kimura et al.
5,344,259 A * 9/1994 Rajala et al. .................... 408/46
5,848,863 A * 12/1998 Liao ............................. 409/203
6,569,071 B1 5/2003 Koren et al.
6,948,879 B2 * 9/2005 Sempliner ..................... 403/381
6,957,809 B1 * 10/2005 Ferrara et al. ................ 269/283
7,281,607 B1 * 10/2007 Kiraly ............................ 182/82
7,287,731 B2 * 10/2007 Johnson ..................... 248/183.3
7,338,532 B2 * 3/2008 Haberman et al. ............. 623/38
7,452,342 B2 * 11/2008 Bonutti et al. .................. 602/16
7,811,024 B2 * 10/2010 Vendetti ........................ 403/381
7,923,657 B2 * 4/2011 Xidacis ...................... 219/69.15
8,066,656 B2 * 11/2011 Bonutti et al. .................. 602/23
8,206,329 B2 * 6/2012 Bonutti et al. .................. 602/16
8,240,075 B1 * 8/2012 Mullin ............................ 42/125
8,287,479 B2 * 10/2012 Bonutti et al. .................. 602/23
8,496,568 B2 * 7/2013 Kalb et al. ...................... 483/19

FOREIGN PATENT DOCUMENTS

CN 2536348 Y 2/2003
TW 201142564 A 12/2011

* cited by examiner

*Primary Examiner* — David M Fenstermacher
(74) *Attorney, Agent, or Firm* — Novak Druce Connolly Bove + Quigg LLP

(57) ABSTRACT

A rotation adjusting mechanism includes a first pedestal, a first sliding block and a first adjusting member. The first pedestal defines a first sliding surface, and an adjusting hole at the side, and an elongated hole on the first sliding surface, the elongated hole communicates with the adjusting hole. The first sliding block defines a second sliding surface and includes an engaging portion on the second sliding surface, the second sliding surface moves on the first sliding surface. The first adjusting member is partially received in the adjusting hole, a portion of the first adjusting member is partially exposed out of the elongated hole and engages with the engaging portion, the adjusting member is turned by hand to rotate to enable the first sliding block to slide along the first sliding surface. The embodiment further discloses an adjusting machine using the same.

18 Claims, 6 Drawing Sheets

ROTATION ADJUSTING MECHANISM AND ADJUSTING MACHINE USING THE SAME

BACKGROUND

1. Technical Field

The present disclosure relates to rotation adjusting mechanisms, and more particularly, to a rotation adjusting mechanism used for rotating reflective mirror and an adjusting machine using the rotation adjusting mechanism.

2. Description of Related Art

In the assembling process, a rotation adjusting mechanism is employed to position workpieces. A typical rotation adjusting mechanism includes a rotation member, a pivotal shaft and a clamping member. The pivotal shaft rotatably extends through a middle portion of the rotation member, the clamping member is fixed to an end of the rotation member. When in use, the clamping member clamps a workpiece, the rotation member is rotated and the clamping member is driven to move to position the workpiece. However, the positioning accuracy of the rotation adjusting mechanism is less than optimal.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
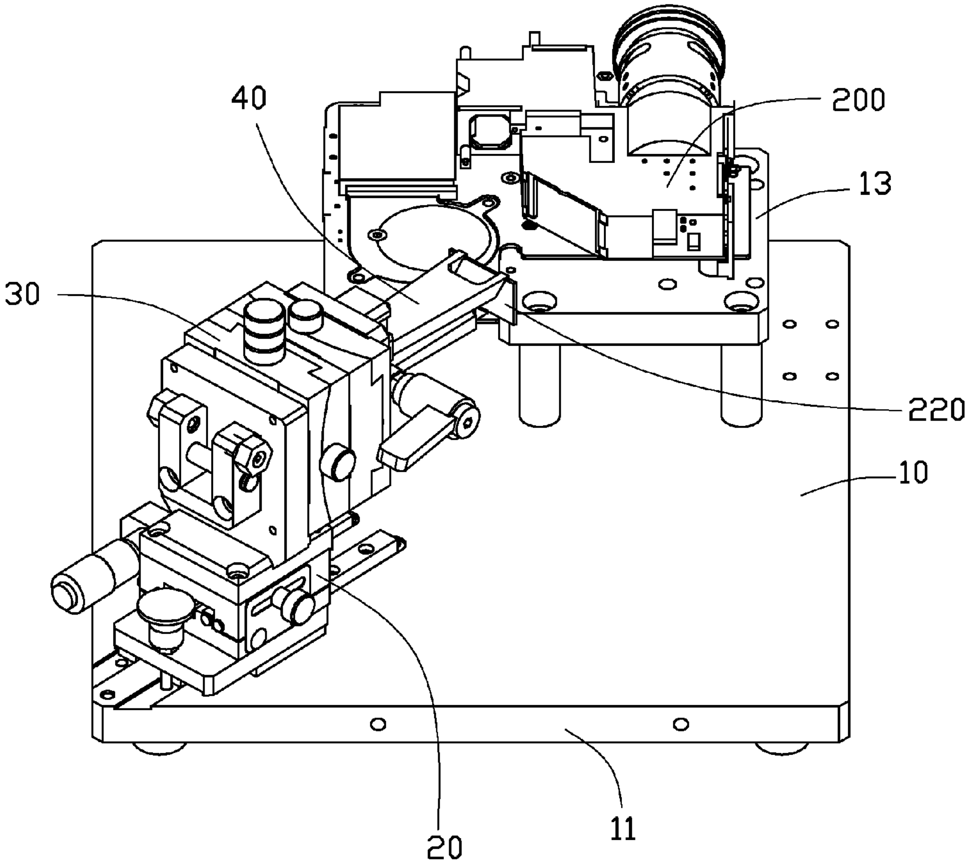
FIG. 1 is an isometric view of an embodiment of an adjusting machine with a workpiece and an electronic device.
Figure 2:
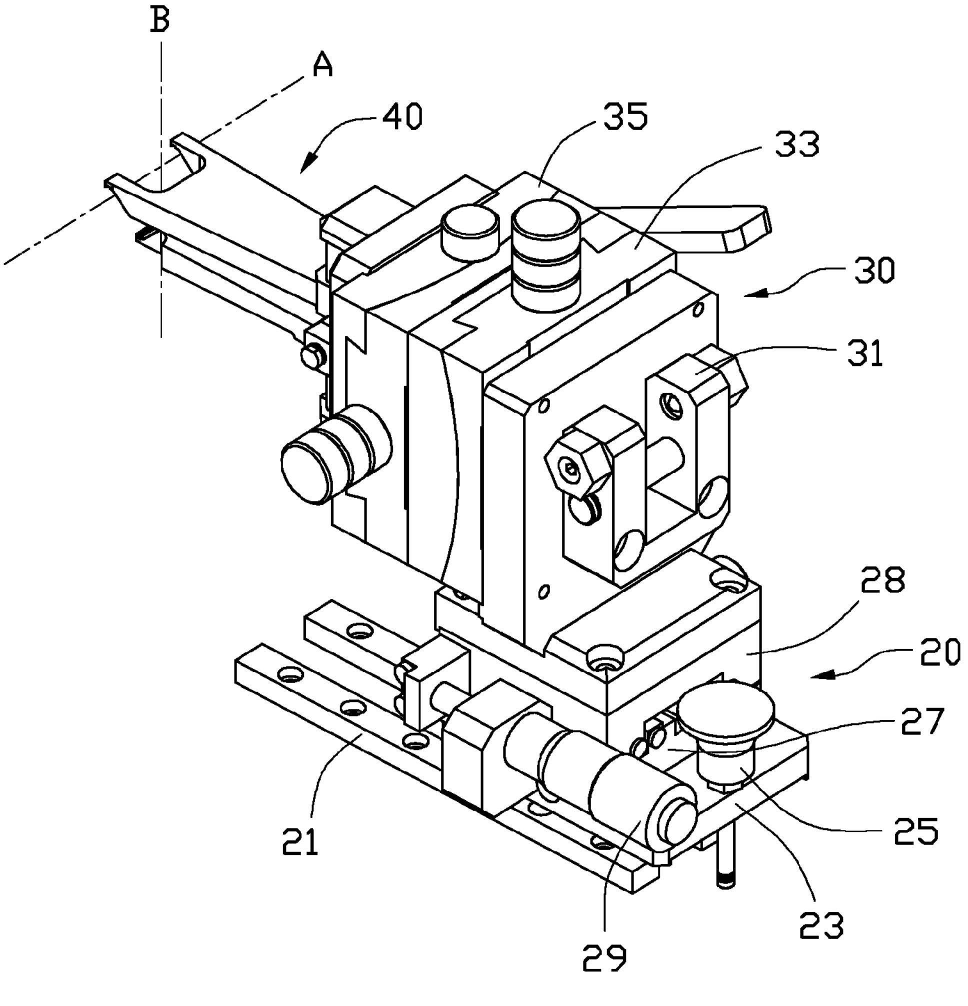
FIG. 2 is an isometric view of the adjusting machine of FIG. 1 without a base seat.

Referring to FIGS. 1 and 2, an embodiment of an adjusting machine 100 includes a base seat 10, a linearity adjusting mechanism 20, a rotation adjusting mechanism 30 and a clamping mechanism 40. The linearity adjusting mechanism 20 is slidably mounted on the base seat 10, the rotation adjusting mechanism 30 is slidably mounted on the linearity adjusting mechanism 20. The clamping mechanism 40 is mounted on the rotation adjusting mechanism 30 and capable of being rotated around a first axis A and a second axis B, to position a workpiece 220 on an electronic device 200. The first axis A and the second axis B are perpendicular to each other and intersect with each other. In the illustrated embodiment, the electronic device 200 is a micro-projector, and the workpiece 220 is a reflecting mirror.

The base seat 10 includes a bottom plate 11 and a feeding table 13 located at a side of the bottom plate 11.

Figure 3:
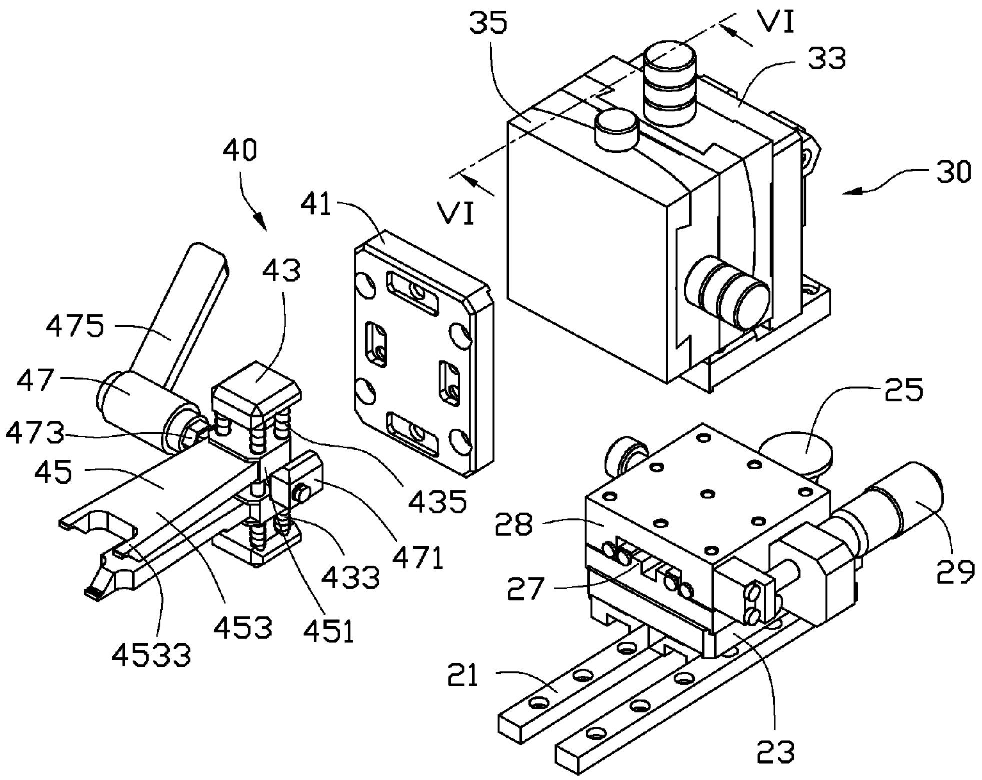
FIG. 3 is an exploded, isometric view of the adjusting machine of the FIG. 2.

Also referring to FIG. 3, the linearity adjusting mechanism 20 includes a first guiding rail 21, a first sliding member 23, a positioning member 25, a second guiding rail 27, a second sliding member 28 and an adjusting member 29. The first guiding rail 21 is fixed to the bottom plate 11 adjacent to the feeding table 13. The first sliding member 23 is slidably mounted on the first guiding rail 21. A part of the positioning member 25 passes through the first sliding member 23, and is capable of being drawn down on the bottom plate 11, to securely fix the first sliding member 23 in place. The second guiding rail 27 is fixed to the first sliding member 23, and the second sliding member 28 is slidably mounted on the second guiding rail 27. The adjusting member 29 is mounted on the second guiding rail 27 and resists on the second sliding member 28 to adjust the sliding distance of the second sliding member 28.

The rotation adjusting mechanism 30 is fixed to the second sliding member 28, and includes a fixing block 31, a first rotation assembly 33 and a second rotation assembly 35 parallel to the first rotation assembly 33. The fixing block 31 and the second rotation assembly 35 are fixed to opposite sides of the first rotation assembly 33.

Figure 4:
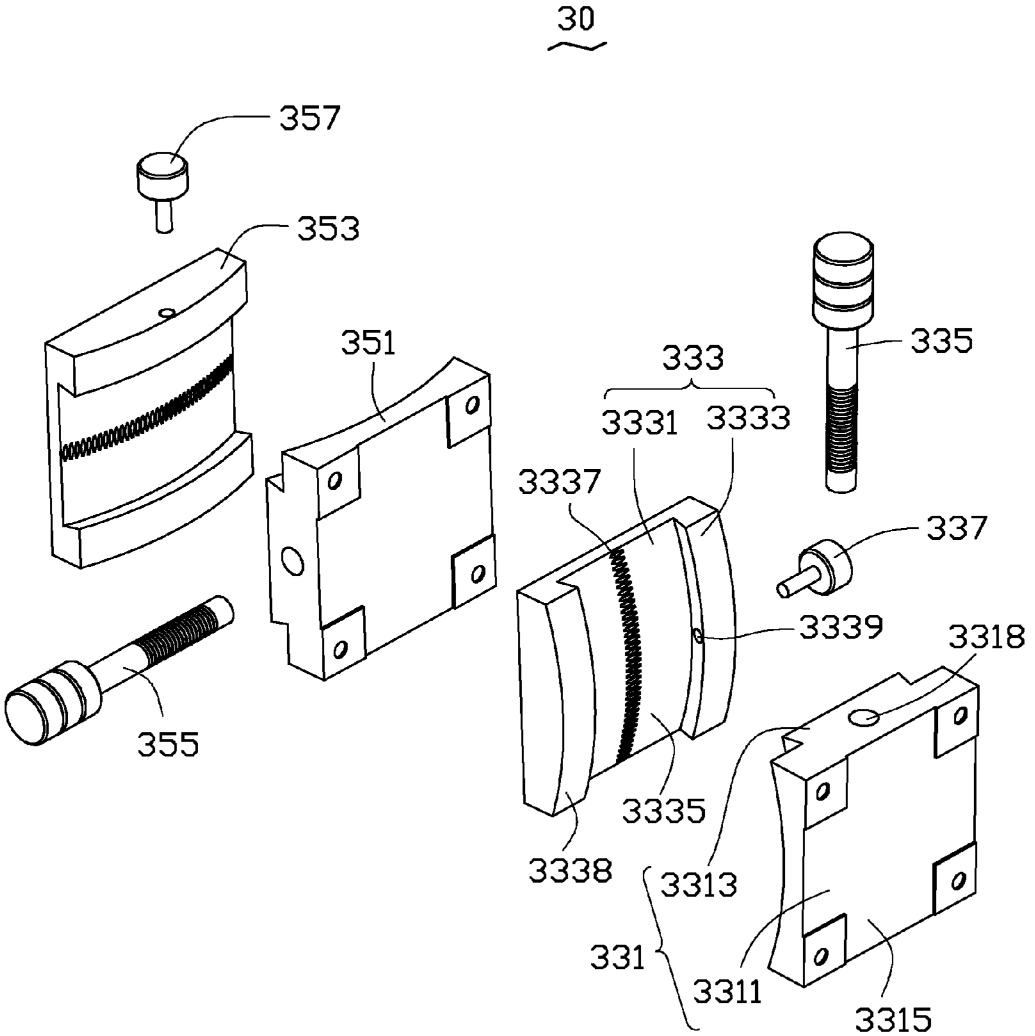
FIG. 4 is an exploded, isometric view of a rotation adjusting mechanism of the adjusting machine of FIG. 3.
Figure 5:
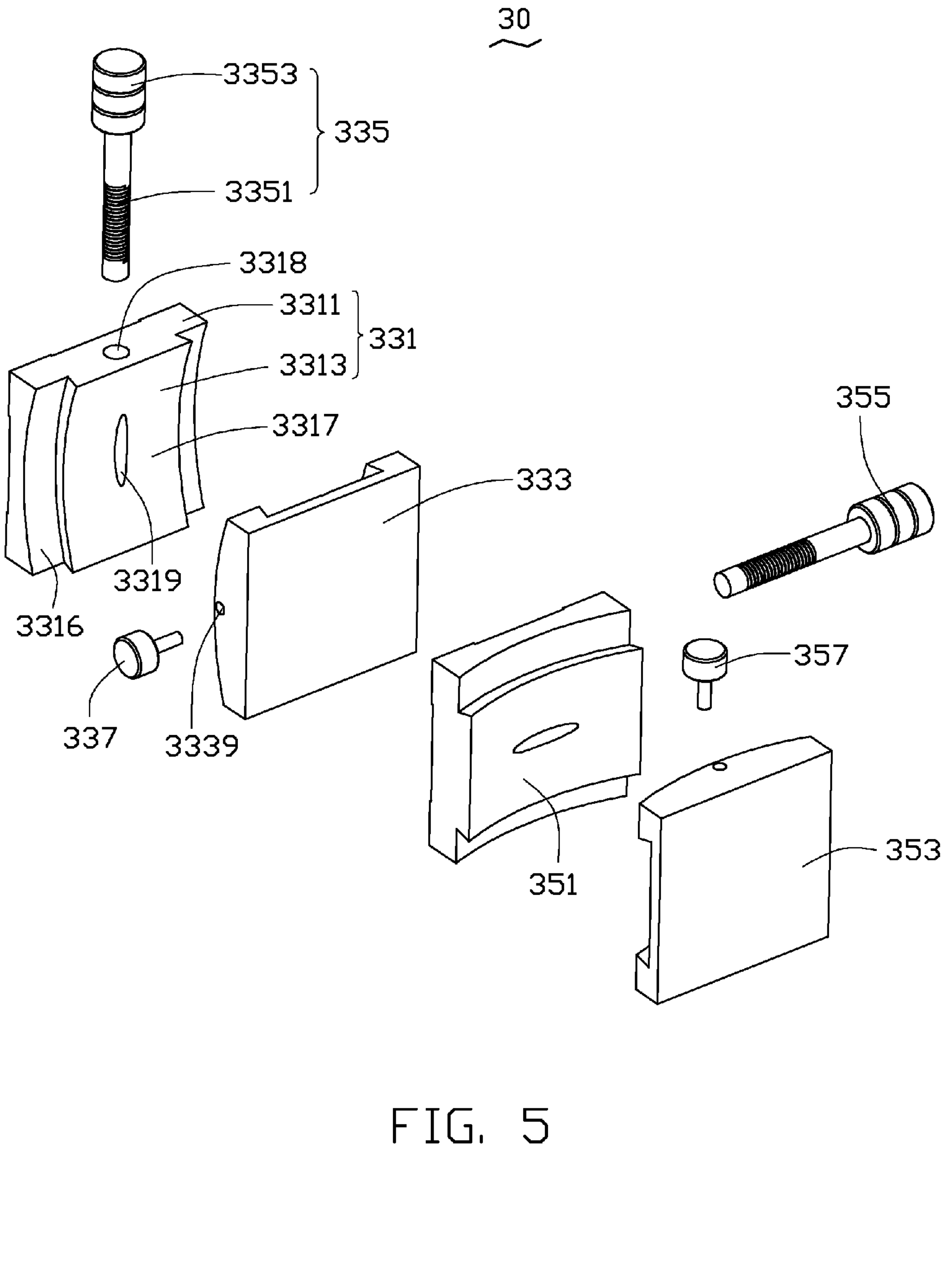
FIG. 5 is similar to FIG. 4, but viewed from another aspect.
Figure 6:
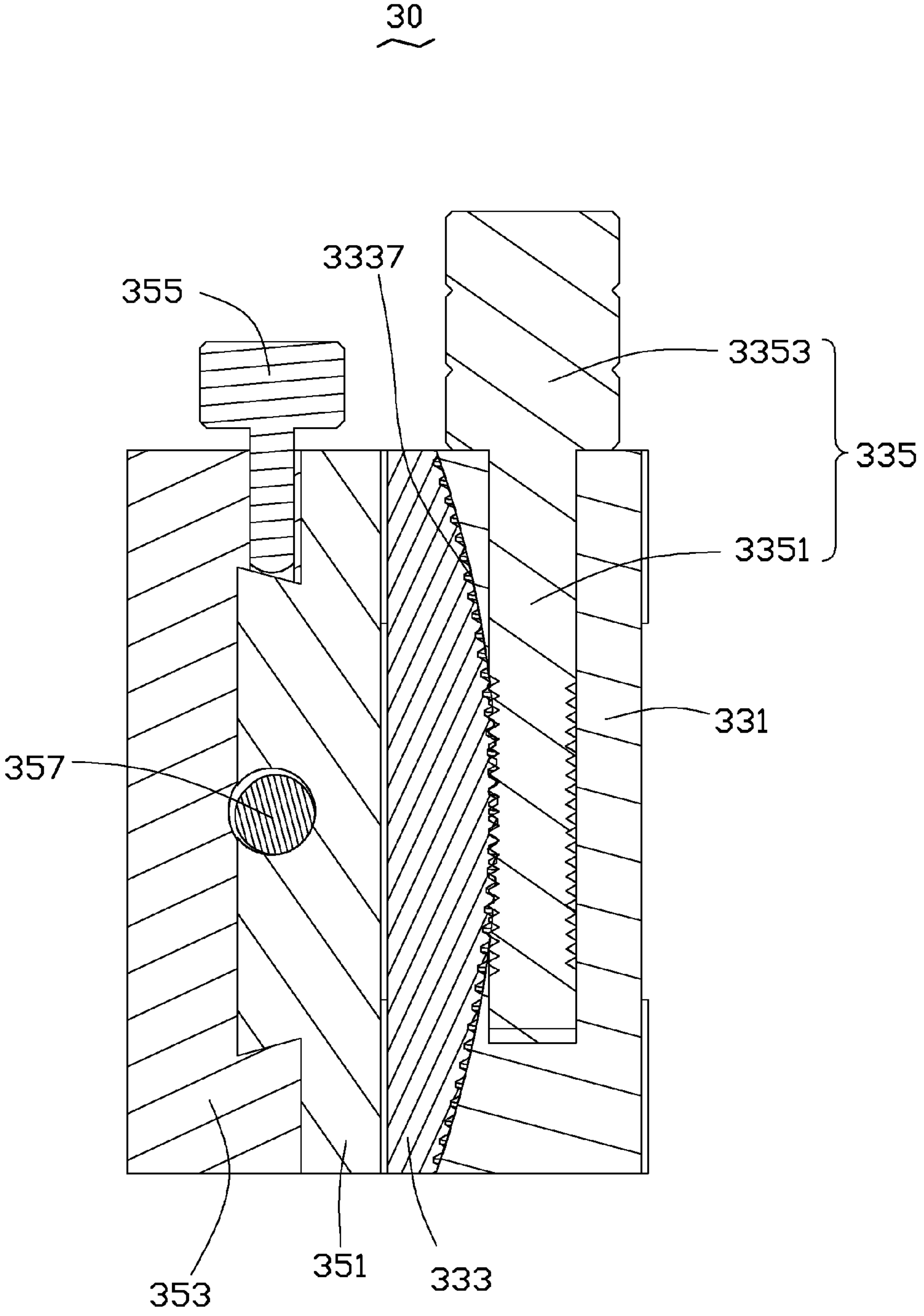
FIG. 6 is a cross-sectional view of a rotation adjusting mechanism of the adjusting machine of FIG. 3, taken along line VI-VI.

Also referring to FIGS. 4 and 5, the first rotation assembly 33 includes a first pedestal 331, a first sliding block 333, a first adjusting member 335 and a first latching member 337. The first pedestal 331 includes a main body 3311 and a first sliding portion 3313 formed on the main body 3311. The main body 3311 defines a fixing surface 3315 and a first engaging surface 3316 at two sides thereof, respectively. The fixing surface 3315 is planar and fixed to the fixing block 31. The first engaging surface 3316 is smoothly concave and follows the circumference of a cylinder based on the first axis A. The first sliding portion 3313 is located at a middle portion of the main body 3311 and protrudes out from the first engaging surface 3316. The first sliding portion 3313 defines a first sliding surface 3317 thereon substantially parallel to the first engaging surface 3316. The distance between a terminal end of a contour line of the first sliding surface 3317 to the fixing surface 3315 is equal to the distance between an opposite terminal end of the contour line of the first sliding surface 3317 to the fixing surface 3315. The first pedestal 331 defines an adjusting hole 3318 on a side surface of the main body 3311 away from the second sliding member 28. An axis of the adjusting hole 3318 can be parallel to the fixing surface 3315, and the movement of the axis of the adjusting hole 3318 resembles a tangent of a circle moving around the circumference of a circle. The first pedestal 331 further defines a slot 3319 (elongated hole) communicating with the adjusting hole 3318 on the middle of the first engaging surface 3316.

The first sliding block 333 includes a base body 3331 and a pair of second sliding portions 3333. The base body 3331 defines a second sliding surface 3335 thereon, and the pair of second sliding portions 3333 protrudes out from opposite edges of the second sliding surface 3335. The base body 3331 further includes an engaging portion 3337 on a middle portion of second sliding surface 3335. The shape of the second sliding surface 3335 is convex and matches that of the first sliding surface 3317. The engaging portion 3337 is a strip parallel to the pair of second sliding portions 3333. The engaging portion 3337 includes a plurality of screw teeth (not labeled) arranged along a length thereof, the plurality of screw teeth are parallel to each other. Each second sliding portion 3333 defines a second engaging surface 3338 corresponding to the first engaging surface 3316, one second sliding portion 3333 defines a locking hole 3339 on a side surface thereof. The shape of the second engaging surface 3338 is convex to correspond to that of the second sliding surface 3335. The locking hole 3339 extends through the second sliding portion 3333, and an axis thereof is perpendicular to the axis of the adjusting hole 3318.

The first adjusting member 335 is partially received in the adjusting hole 3318 of the first pedestal 331. The first adjusting member 335 includes an adjusting portion 3351 and an operation portion 3353 connected to an end of the adjusting portion 3351. The adjusting portion 3351 is received in the adjusting hole 3318 and engages with the first pedestal 331. The adjusting portion 3351 is partially exposed out of the elongated hole 3319 and engages with the engaging portion 3337 of the first sliding block 333. The first adjusting member 335 is capable of driving the first sliding block 333 to slide along the first sliding surface 3317. In the embodiment, the first adjusting member 335 is a bolt.

The first latching member 337 is partially received in and engages with the locking hole 3339 of the first sliding block 333. An end of the first latching member 337 extends out of the locking hole 3339 and resists on the first sliding portion 3313 to position the first sliding block 333 on the first sliding pedestal 331.

The second rotation assembly 35 is the same as the first rotation assembly 33, and includes a second pedestal 351, a second sliding block 353, a second adjusting member 355 and a second latching member 357. The second sliding block 353 slidably engages with the second pedestal 351, the second adjusting member 355 is capable of driving the second sliding block 353 to slide relative to the second pedestal 351. The second latching member 357 is capable of resisting on the second pedestal 351 to position the second sliding block 353 on the second sliding pedestal 351. The second adjusting member 355 is perpendicular to the first adjusting member 335. The second latching member 357 is perpendicular to the first latching member 337. The second rotation assembly 35 is capable of driving the clamping assembly 40 to rotate around the second axis B.

Referring to FIGS. 2 and 3 again, the clamping mechanism 40 is fixed to the second sliding block 353 and includes a fixing plate 41, a guiding assembly 43, a pair of clamping assemblies 45 and a resisting assembly 47. The fixing plate 41 is fixed to the second sliding block 353. The guiding assembly 43 includes a plurality of guiding rods 433 and a plurality of resilient members 435 sleeved on the guiding rods 433. The pair of clamping assemblies 45 is movably mounted on the guiding rods 433 and urged by the plurality of resilient members 435 to move towards each other. Each clamping assembly 45 includes a sliding block 451 slidably sleeved on the guiding rods 433, and a clamping member 453 fixed to the sliding block 451. The clamping member 453 includes a clamping portion 4533 away from the sliding block 451. The resisting assembly 47 is roatably mounted on the fixing plate 41 and capable of driving the pair of clamping assemblies 45 to move away from each other.

The resisting assembly 47 includes a pair of rotation members 471, a resist member 473 and a knob 475. The pair of rotation members 471 is fixed on the fixing plate 41 and spaced from each other. The resist member 473 is rotatably mounted on the pair of rotation members 471, the knob 475 is mounted on an end of the resist member 473. The resist member 473 includes a resist portion (not labeled) between the pair of sliding blocks 451.

Also referring to FIGS. 1 through 6, in assembly, the feeding table 13 is fixed to the bottom plate 11. The first guiding rail 21, the first sliding member 23, the positioning member 25, the second guiding rail 27, the second sliding member 28 and the adjusting member 29 are mounted in turn. The fixing block 31 is fixed to the second sliding member 28, the first pedestal 331 is fixed to the fixing block 31. The first sliding member 23 slidably engages with the first pedestal 331, the first adjusting member 335 and the first latching member 337 are mounted to the first pedestal 331 and the first sliding member 23 respectively. The second rotation assembly 35 is fixed to the first sliding block 333. The fixing plate 41 is fixed to the second sliding block 353. The guiding assembly 43 and the pair of clamping assembly 45 are mounted on the fixing plate 41. The pair of resisting assemblies 47 is rotatably mounted between the pair of clamping assemblies 45 to complete the assembling of the adjusting machine 100.

In use, the electronic device 200 is placed upon the feeding table 13, the knob 475 is turned by hand and drives the resist member 473 to rotate. The resist member 473 drives the pair of clamping members 453 to move away from each other. The workpiece 220 is received between the pair of clamping members 453 and the resist member 473 rotates again to release the plurality of resilient members 435, thus the workpiece 220 is clamped. The pair of clamping members 453 drives the workpiece 220 to move longitudinally along the first guiding rail 21 via the linearity adjusting mechanism 20. The first adjusting member 335 engages with the engaging portion 3337 to enable the first sliding block 335 to slide relative to the first pedestal 331, thus the workpiece 220 is rotated around the second axis A. The second adjusting member 355 drives the second sliding block 355 to slide relative to the second pedestal 351, thus the workpiece 220 is rotated around the second axis B. The workpiece 220 is aligned to the electronic device 200 via incremental motions around the first axis A and the second axis B, the clamping members 453 place the workpiece 220 on the electronic device 200 to finish the adjusting of the workpiece 220.

The first sliding block 333 is capable of rotating around a first axis A relative to the first pedestal 331, and the second sliding block 353 is capable of rotating around a second axis B relative to the second pedestal 351, thus greatly improving the adjusting accuracy of the rotation adjusting mechanism 30 and the presentation of the workpiece 220. As the first rotation assembly 33 and the second rotation assembly 35 are connected to each other as in a laminar manner, thus a volume of the rotation adjusting mechanism 30 decreases. The clamping process of the workpiece 220 merely requires rotation of the resisting member 473, thus operation of the clamping mechanism 40 is much easier.

When the second rotation assembly 35 is attached to the first rotation assembly 37 at an angle, the rotation adjusting mechanism 30 is capable of rotating around a different axis.

When the contour lines of the first engaging surface 3316, the first sliding surface 3317, the second engaging surface 3338 and the second sliding surface 3335 are reformed, the position of the first axis A may be changed. When the structure of the second rotation assembly 35 is reformed, the position of the second axis B may be changed.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A rotation adjusting mechanism, comprising:

a first pedestal comprising a first sliding portion, wherein the first sliding portion defines a first sliding surface thereon, the first pedestal defines an adjusting hole in a side surface thereof and an elongated hole on the first sliding surface, and the elongated hole communicates with the adjusting hole;

a first sliding block defining a second sliding surface and comprising an engaging portion on the second sliding surface, the second sliding surface movable abutting against the first sliding surface, the first sliding block further defining a locking hole on a side surface thereof;

a first adjusting member partially received in the adjusting hole, a portion of the first adjusting member being partially exposed out of the elongated hole and engaging with the engaging portion of the first sliding block, the adjusting member being exerted by an external force to rotate to enable the first sliding block to slide along the first sliding surface; and a first latching member partially received in and engaged with the locking hole of the first sliding block, an end of the first latching member protruding out of the locking hole and resisting on the first sliding portion to position the first sliding block on the first sliding pedestal.

2. The rotation adjusting mechanism of claim 1, wherein the first pedestal further comprises a main body, the first sliding portion protruded out from the main body, the first sliding block comprises a base body and a pair of second sliding portions, the second sliding surface is defined at a side of the base body, the pair of second sliding portions protrudes from opposite edges of second sliding surface, the first sliding portion is received between the pair of second sliding portions, and the first latching member resists on the first sliding portion to position the first sliding block.

3. The rotation adjusting mechanism of claim 2, wherein the main body defines a first engaging surface at a side, the first sliding portion is located on the first engaging surface, each of the pair of second sliding portions defines a second engaging surface thereof, and the pair of second engaging surfaces slidably engages with the first engaging surface.

4. The rotation adjusting mechanism of claim 3, wherein the first engaging surface is a concave arc-surface and equals to a portion of a cylindrical surface centered by a first axis, the first sliding surface is parallel to the first engaging surface, the second sliding surface is a convex arc-surface, the pair of second engaging surfaces is parallel to the second sliding surface, the first sliding surface abuts against the second sliding surface, the first engaging surface abuts against the pair of second engaging surfaces.

5. The rotation adjusting mechanism of claim 1, wherein the adjusting hole is defined on a side surface of the first pedestal, a projection of the axis of the adjusting hole on the first sliding surface is a circular arc-line.

6. The rotation adjusting mechanism of claim 5, wherein the engaging portion is a strip parallel to the second sliding surface, the engaging portion comprises a plurality of screw teeth arranged along a length thereof, and the plurality of screw teeth is parallel to each other.

7. The rotation adjusting mechanism of claim 1, further comprises a second rotation assembly, wherein the second rotation assembly is same as the first rotation assembly, the second rotation assembly comprises a second pedestal, a second sliding block, a second adjusting member and a second latching member, the second sliding block slidably engages with the second pedestal, the second adjusting member is partially received in the second pedestal and perpendicular to the first adjusting member, the second adjusting member is capable of driving the second sliding block to slide along a direction perpendicular to the sliding direction of the first sliding block, the second latching member is partially received in the second sliding block and capable of resisting on the second pedestal to position the second sliding block on the second sliding pedestal.

8. An adjusting machine, comprising:

a base seat;

a linearity adjusting mechanism slidably mounted on the base seat;

a rotation adjusting mechanism slidably mounted on the linearity adjusting mechanism, the rotation adjusting mechanism comprising:

a first pedestal comprising a first sliding portion, wherein the first sliding portion defines a first sliding surface thereon, the first pedestal defines an adjusting hole in a side surface thereof and an elongated hole on the first sliding surface, and the elongated hole communicates with the adjusting hole;

a first sliding block defining a second sliding surface and comprising an engaging portion on the second sliding surface, the second sliding surface movable abutting against the first sliding surface; and a first adjusting member partially received in the adjusting hole, a portion of the first adjusting member being partially exposed out of the elongated hole and engaging with the engaging portion of the first sliding block, the adjusting member being exerted by an external force to rotate to enable the first sliding block to slide along the first sliding surface; and a clamping mechanism mounted on the rotation adjusting mechanism and capable of rotating around a first axis.

9. The adjusting machine of claim 8, wherein the first sliding block further defines a locking hole on a side surface thereof, the rotation adjusting mechanism further comprises a first latching member, the first latching member is partially received in and engages with the locking hole of the first sliding block, an end of the first latching member protrudes out of the locking hole and resists on the first sliding portion to position the first sliding block on the first sliding pedestal.

10. The adjusting machine of claim 9, wherein the first pedestal further comprises a main body, the first sliding portion protrudes from the main body, the first sliding block comprises a base body and a pair of second sliding portions, the second sliding surface is defined at a side of the base body, the pair of second sliding portions protrudes from opposite edges of second sliding surface, the first sliding portion is received between the pair of second sliding portions, the first latching member resists on the first sliding portion to position the first sliding block.

11. The adjusting machine of claim 10, wherein the main body defines a first engaging surface at a side, the first sliding portion is located on the first engaging surface, each of the pair of second sliding portions defines a second engaging surface thereof, the pair of second engaging surfaces slidably engages with the first engaging surface.

12. The adjusting machine of claim 11, wherein the first engaging surface is a concave arc-surface and equals to a portion of a cylindrical surface centered by a first axis, the first sliding surface is parallel to the first engaging surface, the second sliding surface is a convex arc-surface, the pair of second engaging surfaces is parallel to the second sliding surface, the first sliding surface abuts against the second sliding surface, the first engaging surface abuts against the pair of second engaging surfaces.

13. The adjusting machine of claim 8, wherein the adjusting hole is defined on a side surface of the first pedestal, a projection of the axis of the adjusting hole on the first sliding surface is a circular arc-line.

14. The adjusting machine of claim 13, wherein the engaging portion is in a strip materials parallel to the second sliding surface, the engaging portion comprises a plurality of screw teeth arranged along a length thereof, the plurality of screw teeth is parallel to each other.

15. The adjusting machine of claim 8, wherein the rotation adjusting mechanism further comprises a second rotation assembly, the second rotation assembly is same as the first rotation assembly, the second rotation assembly comprises a second pedestal, a second sliding block, a second adjusting member and a second latching member, the second sliding block slidably engages with the second pedestal, the second adjusting member is partially received in the second pedestal and perpendicular to the first adjusting member, the second adjusting member is capable of driving the second sliding block to slide along a direction perpendicular to the sliding direction of the first sliding block, thus enable the clamping mechanism to rotating around a second axis perpendicular to the first axis, the second latching member is partially received in the second sliding block and capable of resisting on the second pedestal to position the second sliding block on the second sliding pedestal.

16. The adjusting machine of claim 8, wherein the clamping mechanism comprises a fixing plate, a guiding assembly, a pair of clamping assemblies and a resisting assembly, the fixing plate is fixed to the rotation adjusting mechanism, the guiding assembly comprises a plurality of guiding rods fixed to the fixing plate and a plurality of resilient members sleeved on the plurality of guiding rods respectively, the pair of clamping assemblies is movably mounted on the plurality of guiding rods and exerted by the plurality of resilient members to move towards each other to clamp a workpiece, the resisting assembly is partially received between the pair of clamping assemblies.

17. The adjusting machine of claim 16, wherein each of the plurality of clamping assemblies comprises a sliding block slidably sleeved on the plurality of guiding rods, a clamping member fixed to the sliding block, the resisting assembly is rotatably mounted on the fixing plate and capable of driving the pair of clamping assemblies to move away from each other.

18. The adjusting machine of claim 17, wherein the resisting assembly comprises a pair of rotation members, a resist member and a knob, the pair of rotation members is fixed to the fixing plate and spaced from each other, the resist member is rotatably mounted on the pair of rotation members, the knob is mounted on an end of the resist member, the resist member is partially received between the pair of sliding blocks and capable drives the pair of sliding blocks to move away from each other.

* * * * *